Dec. 2, 1952     C. BUCKWALTER     2,620,010
WHEEL AND TIRE FOR AIRPLANES
Filed Oct. 14, 1947     2 SHEETS—SHEET 1
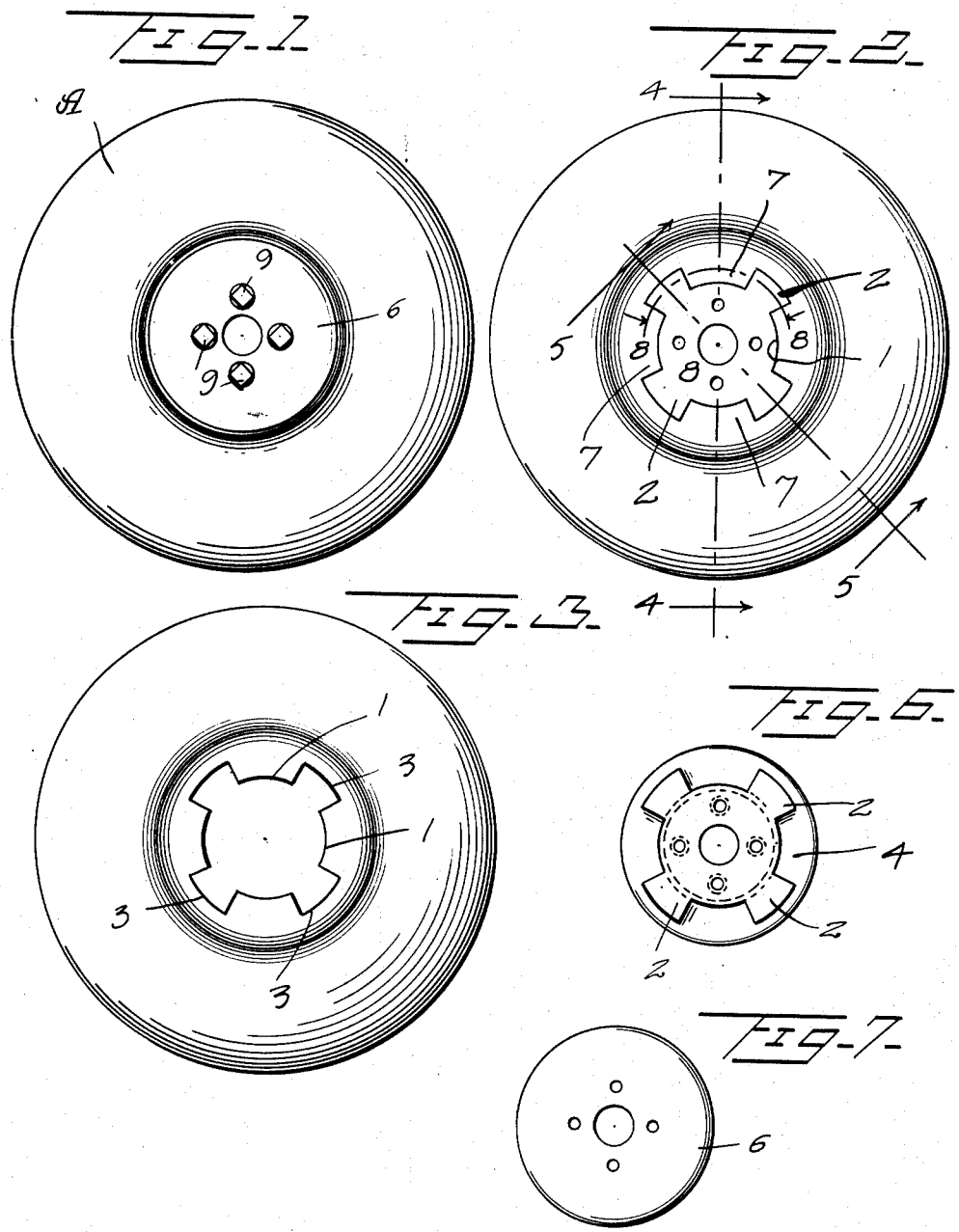
Inventor
Charles Buckwalter
By John Patton D. Apple
Attorney Dec. 2, 1952     C. BUCKWALTER     2,620,010
WHEEL AND TIRE FOR AIRPLANES
Filed Oct. 14, 1947     2 SHEETS—SHEET 2

Inventor
Charles Buckwalter
By John Catten Doggie
Attorney

Patented Dec. 2, 1952

2,620,010

UNITED STATES PATENT OFFICE 2,620,010

WHEEL AND TIRE FOR AIRPLANES

Charles Buckwalter, Norristown, Pa.

Application October 14, 1947, Serial No. 779,670

1 Claim. (Cl. 152—384)

This invention relates to new and useful improvements in wheels and tires for aeroplanes.

One object of my invention is to provide the beads on both sides of the tire with circumferentially spaced aligned radial flanges and the opposite sides of the wheel with radial dove-tail lugs that fit in the spaces or notches between the corresponding radial flanges of the tire beads and interlock with the latter, thus eliminating blow-outs in landings due to relative slipping of the tire in the wheel, and facilitating greater ease and speed in changing tires.

A further object of my invention is to provide novel interlocking means between the tire and wheel, whereby the wheel will hold the tire in place without excessive pressure between the wheel and bead of the tire, thus eliminating the possibility of breaking beads loose and thereby increasing the safety factor in landing.

With the foregoing and other objects in view that will appear as the nature of my invention is better understood, the same consists in the novel features of construction, combination and arrangement of parts illustrated in the accompanying drawings and more particularly pointed out in the appended claim.

In the accompanying drawings, which are for illustrative purposes only and are therefore not drawn to scale:

Figure 1 is a side elevation of a wheel and tire for aeroplanes, constructed in accordance with my invention.

Figure 2 is a similar view, with the demountable disc removed.

Figure 6 is a side view of the wheel.

Figure 7 is an outer face view of the demountable disc, and Figure 8 is an enlarged cross section, taken on line 8—8 of Figure 2.

Referring to the drawings for a more particular description of my invention, and in which drawings like parts are designated by like reference characters throughout the several views, A designates the tire and B the wheel.

Figure 5:
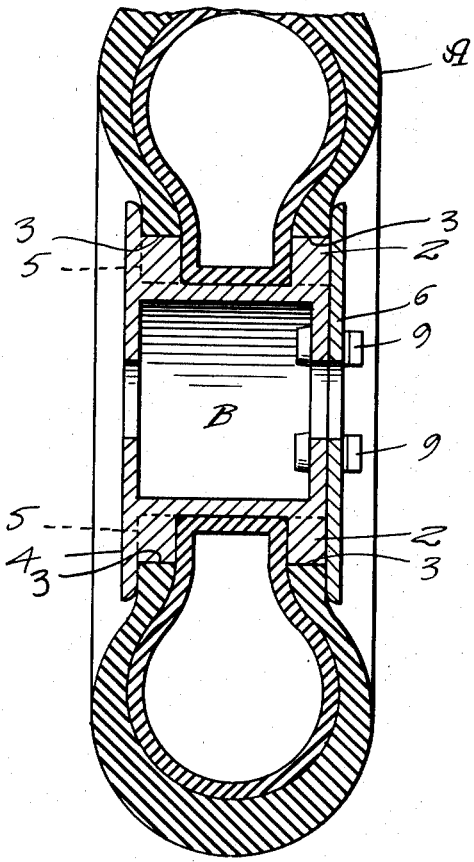
Figure 5 is an enlarged diagonal cross section, taken on line 5—5 of Figure 2.
Figure 4:
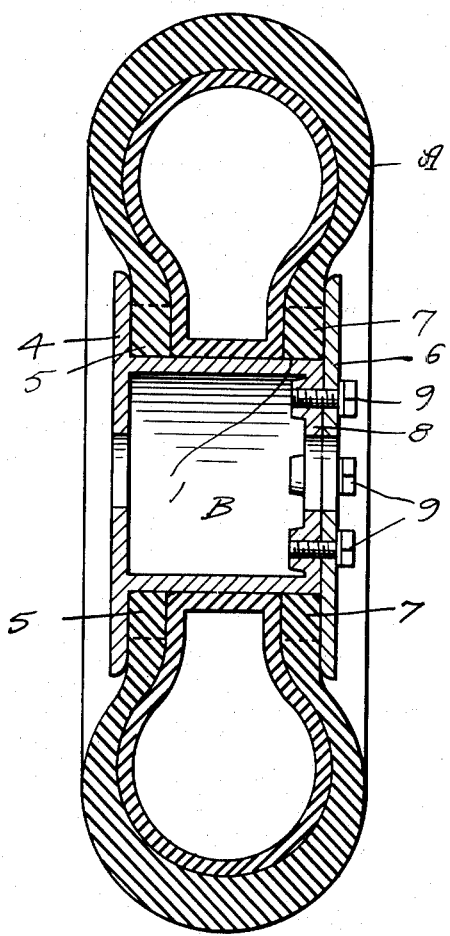
Figure 4 is an enlarged vertical transverse section, taken on line 4—4 of Figure 2.
Figure 3:
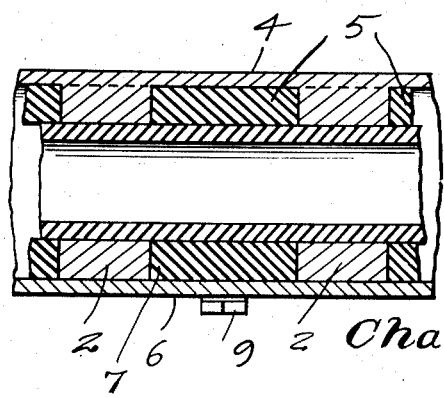
Figure 3 is a side elevation of the tire.

In carrying out my invention, the beads on both sides of the tire A are formed with circumferentially spaced inwardly extending aligned radial flanges 1, and opposite sides of the wheel B with radial dove-tail lugs 2 that fit in the spaces or notches 3 between the corresponding flanges 1 of the tire beads, and interlock with the latter. This will prevent blow-outs in landing, due to relative slipping between the tire and wheel and facilitate greater ease and speed in changing tires.

One side of the wheel B is formed with an annular integral flange 4, which fits against the outer face of the corresponding bead 5 of the tire, and the opposite side of the wheel with a demountable disc 6, which fits against the other bead 7 of the tire and is secured to the adjacent side 8 of the wheel by the transverse bolts 9.

My novel wheel will hold the tire in place without excessive pressure between the wheel and beads of the tire, thus eliminating the possibility of breaking beads loose from the tire and increasing the safety factor in landings.

From the foregoing description taken in connection with the drawings, it is thought that the construction, operation and advantages of my invention will be readily understood, without requiring a more extended explanation.

Having described my invention, what I claim as new and desire to secure by Letters Patent, is:

In combination with a pneumatic aeroplane tire having beads at both sides of the tire formed with circumferentially spaced aligned radial tongues, leaving recesses between said tongues, a wheel formed at both sides with radial dove-tail lugs extending into the recesses between and interlocking with the corresponding tongues of the beads, an annular integral flange at one side of the wheel fitting against the outer face of the corresponding tire bead and a demountable disc fastened to the other side of the wheel and engaging the outer face of the opposite bead.

CHARLES BUCKWALTER.

REFERENCES CITED

The following references are of record in the file of this patent:

UNITED STATES PATENTS

| Number | Name | Date |
|---|---|---|
| 587,656 | Mann | Aug. 3, 1897 |
| 1,090,727 | Leach | Mar. 17, 1914 |
| 1,121,483 | Crawford | Dec. 15, 1914 |
| 1,465,476 | Lane | Aug. 21, 1923 |
| 2,252,481 | Cox | Aug. 12, 1941 |
| 2,261,823 | Ballard | Nov. 4, 1941 |
| 2,280,568 | Brown | Apr. 21, 1948 |